United States Patent Office 2,873,083
Patented Feb. 10, 1959

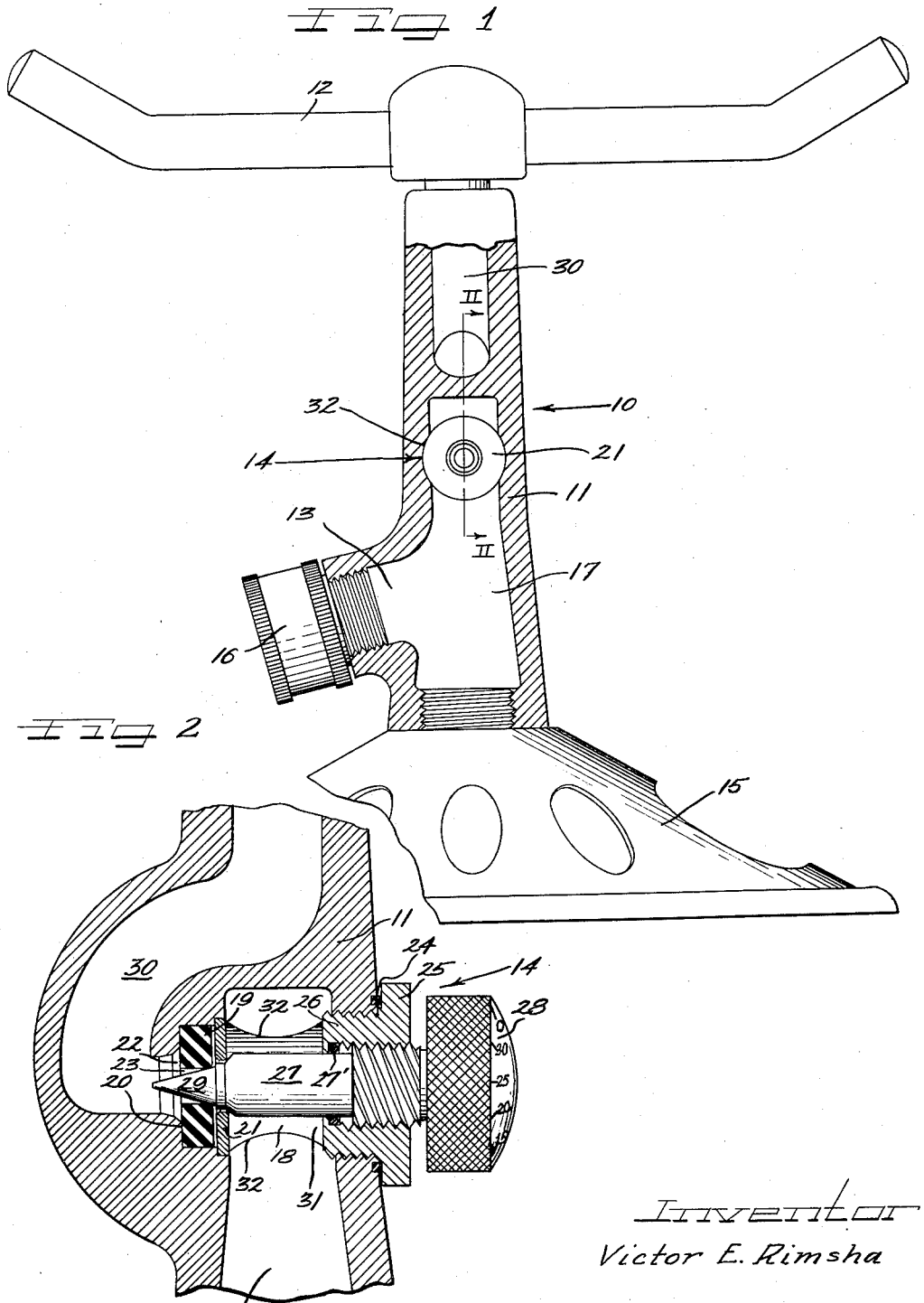

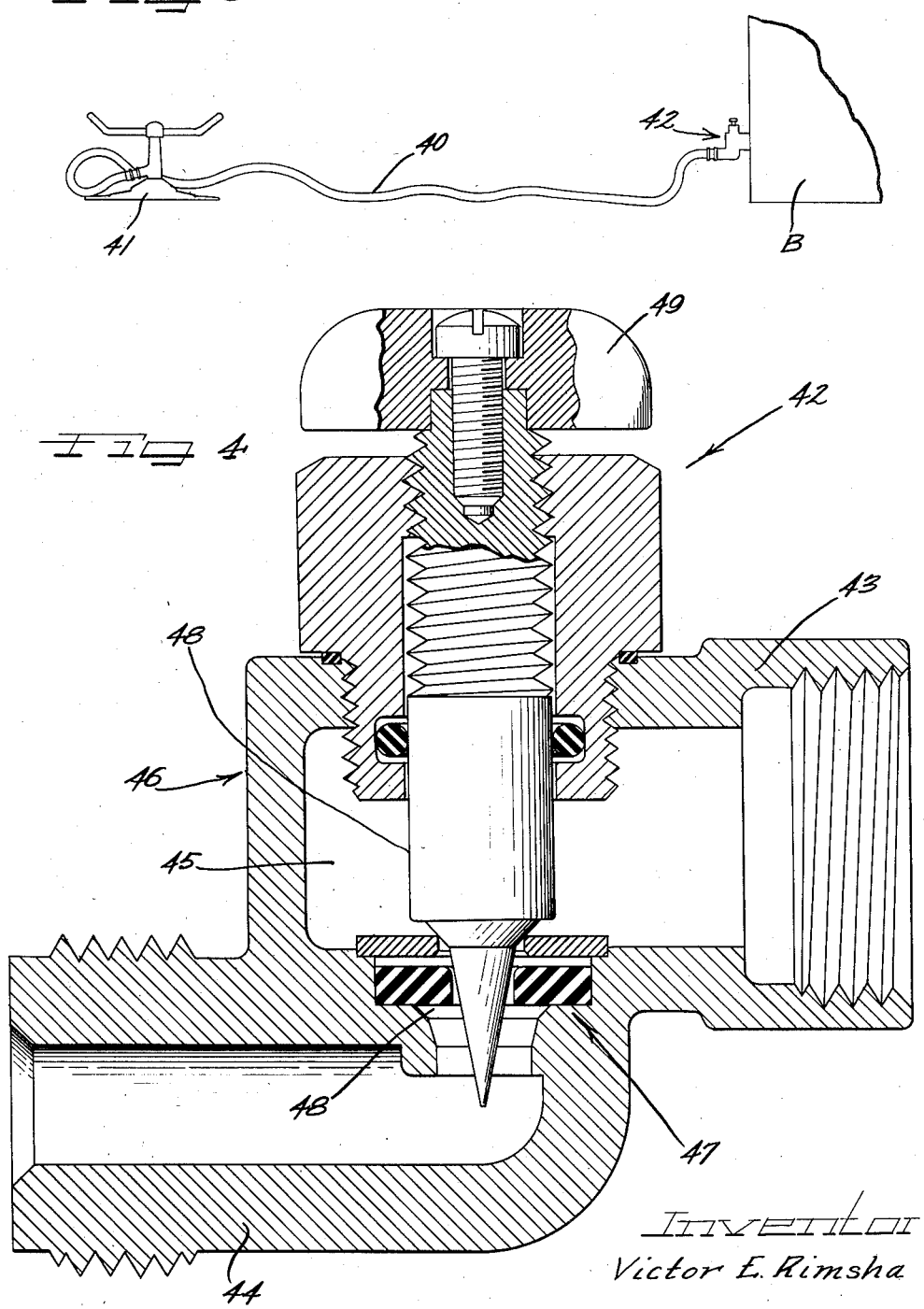

2,873,083

FLOW CONTROL VALVE

Victor E. Rimsha, Chicago, Ill., assignor to The Dole Valve Company, Chicago, Ill., a corporation of Illinois Application October 28, 1953, Serial No. 388,771

1 Claim. (Cl. 251—121)

This invention relates to improvements in a sprinkling system of the type used for sprinkling lawns and more particularly relates to the use of a simplified form of flow control contained within the sprinkling system.

The conventional sprinkler is a familiar garden accessory but has the disadvantage of sprinkling in too great a radius when the water pressure increases after the sprinkling radius has been set. Conversely, if the pressure fails, sprinkling has to be prolonged in order to disperse over the surface the normal or expected amount of water.

As is well known, this variation of pressure can be and is quite disturbing, for many reasons. On occasion, gardeners like to water evenly so as to keep their grasses, plants, etc., at the same stage of development. Other times, while watering close to the side of a home and its windows, the housewife will be confronted with smeared windows as a result of an increase in pressure. Hence, it is readily discernible that there are numerous applications where a "flow controlled" sprinkler would work to a particular advantage.

An object of this invention is to eliminate the foregoing disadvantageous variation of liquid discharge from a sprinkler system by providing for a uniform rate of sprinkling, irrespective to variations in liquid supply pressure.

Another object of this invention is to provide a sprinkler system flow shut-off valve which in itself also enables the additional function of providing for a uniform rate of liquid flow when the valve is open.

A feature of this invention relates to the provision within a sprinkler system of a liquid control member enabling the control of a varying rate of flow in the inlet as the liquid subseqently passes through the member.

A further feature of this invention provides in a sprinkler system a liquid flow control member with a readily adjustable metering pin to cooperate with the liquid flow control member in effecting a predetermined control relationship.

A still further feature of this invention relates to providing within a sprinkler of the creeping type a liquid flow control member, in order to provide a uniform ground-covering spread.

Another feature of this invention pertains to the provision within a sprinkler system of a novel and simplified shut-off valve which is capable of increasing or decreasing the amount of water passing through the system at a given water pressure.

A further feature of the invention relates to a simplified form of shut-off valve combined with a resilient annulus within a sprinkling system, in order to deliver a constant volume of liquid regardless of variations in pressure of the liquid at the inlet of the valve and having a manual control which may be gripped in the hand and whereby the rate of flow may be further controlled through the use of a needle valve.

Other objects and features of this invention will more fully appear from the following detailed description taken in connection with the accompanying drawings, which illustrate two embodiments thereof and in which:

Figure 1 is a fragmentary view in side elevation with certain parts shown in vertical cross-section showing a sprinkler embodying this invention;

Figure 2 is an enlarged cross-sectional view taken on substantially the line II—II of Figure 1, looking in the direction indicated by the arrows;

Figure 3 is a diagrammatical view of a modified form of flow control and shut-off valve embodied in a sprinkler system; and Figure 4 is an enlarged vertical cross-sectional view of the modified form of flow control and shut-off valve shown in Figure 3.

As shown on the drawings:

In Figure 1, the reference numeral 10 designates generally a lawn sprinkler of a conventional type with the exception of the flow control feature to be hereinafter described. Accordingly, the lawn sprinkler 10 has a tubular sprinkler body or housing 11, the sprinkler body having any suitable sprinkler nozzle 12 swingably mounted on the sprinkler body 11 in a plane substantially perpendicular to the plane of the sprinkler body 11. The sprinkler nozzle 12 has a supply conduit or passage 13 supplying liquid to the sprinkler nozzle 12 after passing through a flow control member 14 embodying the features of my invention. The sprinkler body 11 is mounted on a base plate 15 which is in a plane substantially parallel to the plane of the sprinkler nozzle 12.

Located between the flow control member 14 and the base plate 15, and projecting outwardly therefrom, is a hose mounting ring fitting 16 for engagement with a hose supply unit (not shown) leading to the liquid or water source (not shown).

In Figure 2 there is shown a cross-sectional view taken through the body at the flow control member 14, the reference numeral 17 indicating the upstream channel of the sprinkler body 11 leading into a valve chamber 18 and thence into a resilient or rubber-like annulus or ring 19 offset relative to the upstream channel 17. This annulus, in accordance with the features of this invention, is supported by a shoulder 20 in the sprinkler body 11 and is held in position by a retainer 21, which may be a snap ring.

The annulus or flow control 19 flexes within the edge of the shoulder 20 into a frusto-conical surface 22 of body 11, upon increases in pressure on the upstream side 17 of the annulus 19 effecting a reduction in the cross-sectional area of an inner peripheral margin of ring orifice 23 leading therethrough. The retainer or snap ring 21 is shown as being seated at one end of the valve chamber 18 in vertically spaced relation with respect to the annulus 19 to retain the annulus 19 in position to be engaged with the shoulder 20 and flexed within the frusto-conical surface 22 upon the application of pressure thereto.

The resilient annulus or ring 19 may be of the type similar to that shown and described in Patent No. 2,389,134 which was issued to C. A. Brown on November 20, 1945. Such a flow control annulus is generally in the shape of a washer or flat ring having a central opening or orifice leading therethrough, the diameter of which is considerably smaller than the diameter of the inner marginal edge of the ring supporting shoulder 20.

The sprinkler body 11 opposite from the annulus 19 is shown as having a packing member or gasket 24 held seated therein by a sleeve type plug 25 which is threaded into a body opening 26 axially aligned with annulus 19. The sprinkler body 11 is shown as being recessed and threaded inwardly of the packing member 24 to receive the plug 25; the plug cooperating internally thereof with a partially threaded needle pin 27, which has a handle 28 on one end, outside of the sprinkler body 11. An O-ring 27' seal is located in the bore of and between the plug 25 and the needle pin 27. A conical free end 29 of needle pin 27 is shown as being adjustably projected into the orifice 23 leading through the resilient annulus 19 for adjustably blocking the flow of liquid therethrough and to the downstream passage 30 in body 11 leading to nozzle 12.

It should be noted that the upstream or inlet passage 17 of body 11 has a transverse cylindrical bore 31 and is of a larger diameter than the vertical cylindrical passage or bore 17 of the sprinkler body 11. This bore 31 (Fig. 2) is axially aligned with the seat of ring 21 and with threaded plug opening 26. The curved lines 32—32, as shown in Figure 2, designate the intersection of the two bores. The transverse bore is purposely made larger than the vertical bore so as to permit of the installation and seating of the rubber annulus 19 and the retainer ring 21 which are inserted through the threaded opening 26 in which the plug 25 is screwed.

The generally conical end 29 of the needle pin 27 has the advantageous feature of not only serving as a shutoff medium with respect to closing the orifice 23 in the annulus 19, but also may serve in a metering function to control or regulate the liquid flow through the orifice 23. The needle pin end 29 is removable from the orifice 23 upon the turning of the manually operable handle 28. Thus, upon turning, the conical end 29 of the needle pin 27 may be withdrawn from the annulus to enable free flow of liquid through orifice 23.

As the inlet or upstream pressure increases in body 11, the resilient annulus 19 will flex within the frusto-conical surface 22 in response to such increased pressure resulting in a reduction in the cross-sectional area of orifice 23 on its upstream side and an increase in cross-sectional area of said orifice on the downstream side 30 thereof thereby providing a constant rate of flow through the downstream side 30 of sprinkler body 11 regardless of variations in pressure of the fluid in the supply conduit 13.

It should further be understood that the overall effect obtained is dependent upon a number of factors as follows: the shape of the metering pin 29, the dimension and resiliency of the annulus 19, and the mounting of the annulus 19 and the relationship of the metering pin with respect to the annulus. Any one of a large number of relationships of liquid flow to liquid pressure can be obtained and, hence, if desired, a substantially constant liquid flow can be obtained over a wide range of input pressure.

While a radial bladed type of conventional nozzle 12 is shown, it is to be understood that within the spirit and scope of this invention this nozzle could be of any other suitable type and especially, for example, could be of the so-called ground travelling or creeping type. In the latter event, the flow control means of this invention would be utilized in the creeping sprinkler to enable a uniform ground covering speed as the rate of travel in such sprinklers is dependent upon the pressure of the water being discharged.

In Figures 3 and 4 there is illustrated a second species of the invention which, however, as far as the flow control principle is concerned, operates in the same manner as the first described embodiment. In this form it is contemplated that the flow control device may be used in conjunction with the sprinkler system or hose line as a separate entity. This may be desirable where sprinklers are already in use and the purchaser merely wishes to have flow control without the necessity of replacing the sprinkler itself.

Thus, the first form of the invention lends itself to use as a sprinkler unit whereas the second form is especially desirable for use in conjunction with an existing conventional sprinkler for enabling flow control.

Both forms of the invention embody the fundamental flow control washer together with a restricting axial rotatable needle valve member for varying the amount of water delivered in much the same manner as a conventional faucet and shut-off valve is now employed to cut down or increase the flow of water. In addition, the needle valve member serves as a shut-off valve since when it is in its ultimate closed position it will close off all flow through the flow control means.

Hence, it will be appreciated that the first form is especially desirable since, when it is incorporated in a single sprinkler assembly, it not only constitutes flow control means but also a shut-off valve.

In Figure 3, there is illustrated a conventional hose line 40 having connected to its outer extremity any suitable sprinkler, designated generally by the reference character 41. In addition to the elements 40 and 41, this sprinkler system embodies a shut-off valve assembly 42 which incorporates the flow control features of this invention. It may be connected to any suitable source of fluid supply or pipe emanating from a building or the like shown diagrammatically at B in Figure 3.

The combination flow control and shut-off valve 42, in this embodiment of the invention, is clearly illustrated in Figure 4 and it will be readily perceived that insofar as its function and operation is concerned, it is quite similar to the first form, as shown in Figure 2, with the exception that it is not embodied in the body of the sprinkler itself.

This combination device 42 includes an inlet 43 for threaded detachable connection to a supply pipe line (not shown) and an externally threaded outlet 44 for detachable connection to the inlet end of the hose line 40 in the usual or conventional way. Actually, the outlet 44 corresponds to the typical faucet outlet now in common use at homes for connection to a garden hose. The flow through the inlet 43 and the outlet 44 is in parallel directions but in order for the fluid or liquid to enter the outlet 44, it must first enter an intermediate chamber 45 in a housing 46 which has, as integral components thereof, the outlet 43 and the outlet 44.

A flow control washer assembly 47 is disposed in an opening 48 connecting the chamber 45 with the outlet 44. This flow control assembly is substantially similar to that described in Figure 2 and, hence, it is not thought that it need be further described in detail.

Cooperable with this flow control assembly 47 is a rotatable threaded needle valve member 48a including a handle 49 for rotating the same. Since this needle valve member 48a and its component parts are substantially similar to the needle valve member 27 described in the first form of the invention, it is believed that no further detail description of the same is necessary especially since it functions in identically the same manner as in the preferred form. This needle valve member, as in the first form, serves as a manually operable shut-off valve for closing off or regulating the volume of the fluid or liquid in much the same manner as the valve in a conventional household garden hose faucet and valve assembly.

Thus, in both forms of the invention the rate of discharge flow may be uniformly controlled by the flow control washer 47 and the volume of water delivered thereto may be regulated by the turning of the needle valve member in much the same manner as a house faucet valve is now employed for opening up or cutting down the flow of water to a hose. However, the advantage of each device is that it embodies in a unitary form both the valve and flow control means and wherein the flow control means is cooperable with the needle valve member in the regulation of the flow. This enables a simple arrangement and does not involve much, if any, additional cost over the conventional valve with the exception of the addition of the relatively inexpensive flow control washer.

If it is so desired, in either form of the invention, the handle for adjusting the rate of flow could be provided with indicia to indicate different adjusted positions of the handle. For this connection, attention is directed to Figure 2 wherein the handle 28 has indicia thereon reading 10—15—20—25—30 indicative in terms of feet of the diameter of the spray for different adjustments of the handle. For illustration, if the handle is turned to an extent to bring the numeral 10 uppermost, it will indicate that the valve is adjusted to give a spray of ten feet. If a larger spray is desired, the handle is turned to a further extent until the desired rate is reached.

It will be understood that various modifications and variations of the present invention may be effected without departing from the scope of the novel concepts thereof as defined in the appended claim.

I claim as my invention:

In a variable orifice constant rate of flow control device including a casing having a fluid inlet and an outlet, a resilient annular flow control member having a central deformable orifice, an annular seat in said casing the inner margin of which is of a greater diameter than the diameter of said orifice and supporting said flow control member in the path of the flow of fluid along said casing, said flow control member being deformable within the inner margin of said seat toward the outlet in response to variations in pressure on said flow control member, a plunger-like element having an axial portion aligned with and projecting into said orifice from the inlet side of said flow control member for cooperation therewith in controlling the rate of flow through said outlet, means for moving said plunger portion relatively to said orifice to change the controlled rate of flow, said axial plunger portion having an external annular tapered surface telescopingly cooperating with said orifice for effecting a given rate of flow for each movement of change in the relative changes of position of said plunger portion with respect to said orifice, and an annular retaining member on the upstream side of said flow control member for assisting in the retention of said flow control member in position, the open portion of said annular retaining member being of a larger diameter than the diameter of said orifice and forming a valve seat for cooperation with said plunger portion to shut off the flow of fluid to the outlet.

References Cited in the file of this patent

UNITED STATES PATENTS

| | | |
|---|---|---|
| 207,756 | Maguire | Sept. 3, 1878 |
| 273,940 | Bonninghausen | Mar. 13, 1883 |
| 2,091,874 | Neuhaus | Aug. 31, 1937 |
| 2,454,929 | Kempton | Nov. 30, 1948 |
| 2,572,244 | Chace | Oct. 23, 1951 |
| 2,619,116 | Ralston | Nov. 25, 1952 |
| 2,645,449 | Gulick | July 14, 1953 |
| 2,684,081 | Chace | July 20, 1954 |
| 2,700,307 | Thoresen | Jan. 25, 1955 |
| 2,723,159 | Nelson | Nov. 8, 1955 |

FOREIGN PATENTS

| | | |
|---|---|---|
| 478,144 | Great Britain | Jan. 13, 1938 |